US008346239B2

(12) United States Patent
Wang et al.

(10) Patent No.: US 8,346,239 B2
(45) Date of Patent: Jan. 1, 2013

(54) METHODS, SYSTEMS, AND COMPUTER PROGRAM PRODUCTS FOR SILENCE INSERTION DESCRIPTOR (SID) CONVERSION

(75) Inventors: Yanhua Wang, Frisco, TX (US); Philip Abraham, Allen, TX (US)

(73) Assignee: Genband US LLC, Plano, TX (US)

( * ) Notice: Subject to any disclaimer, the term of this patent is extended or adjusted under 35 U.S.C. 154(b) by 1049 days.

(21) Appl. No.: 11/965,994

(22) Filed: Dec. 28, 2007

(65) Prior Publication Data
US 2008/0160987 A1 Jul. 3, 2008

Related U.S. Application Data

(60) Provisional application No. 60/877,439, filed on Dec. 28, 2006.

(51) Int. Cl.
*H04Q 7/20* (2006.01)
(52) U.S. Cl. ............... 455/422.1; 704/201; 704/262
(58) Field of Classification Search ............... 455/422.1, 455/563, 517; 704/201; 370/466, 474
See application file for complete search history.

(56) References Cited

U.S. PATENT DOCUMENTS

| | | |
|---|---|---|
| 3,652,798 A | 3/1972 | McNeilly et al. |
| 4,048,446 A | 9/1977 | Hafner et al. |
| 4,455,649 A | 6/1984 | Esteban et al. |
| 4,545,052 A | 10/1985 | Steierman |
| 5,295,136 A | 3/1994 | Ashley et al. |
| 5,375,121 A | 12/1994 | Nishino et al. |
| 5,612,957 A | 3/1997 | Gregerson et al. |
| 5,710,976 A | 1/1998 | Hill et al. |
| 5,740,157 A | 4/1998 | Demiray et al. |
| 5,905,873 A | 5/1999 | Hartmann et al. |
| 5,930,264 A | 7/1999 | Nguyen |

(Continued)

FOREIGN PATENT DOCUMENTS

CA 2336699 A1 1/2000
(Continued)

OTHER PUBLICATIONS

Notification of Transmittal of the International Search Report and the Written Opinion of the International Searching Authority, or the Declaration for International Application No. PCT/US07/26413 (Apr. 29, 2008).

(Continued)

*Primary Examiner* — Phuoc Doan
(74) *Attorney, Agent, or Firm* — Jenkins, Wilson, Taylor & Hunt, P.A.

(57) ABSTRACT

Methods, systems, and computer program products for silence insertion descriptor (SID) conversion are disclosed. According to one aspect, the subject matter described herein includes a method for silence insertion descriptor (SID) conversion. The method includes receiving a wireless frame, the frame identifying a first node as a frame source and a second node as a frame destination; determining whether tandem-free operation (TFO) is applicable; responsive to a determination that TFO is applicable, determining whether the frame is a SID frame; responsive to a determination that the frame is a SID frame, determining whether the SID format used by the first node is incompatible with the SID format used by the second node; and responsive to a determination that the SID format used by the first node is incompatible with the SID format used by the second node, converting the SID frame from the SID format used by the first node to the SID format used by the second node.

15 Claims, 7 Drawing Sheets

U.S. PATENT DOCUMENTS

| | | |
|---|---|---|
| 5,933,487 A | 8/1999 | Strickland |
| 5,995,923 A | 11/1999 | Mermelstein et al. |
| 5,999,529 A | 12/1999 | Bernstein et al. |
| 6,006,189 A | 12/1999 | Strawczynski et al. |
| 6,009,467 A | 12/1999 | Ratcliff et al. |
| 6,026,086 A | 2/2000 | Lancelot et al. |
| 6,031,904 A | 2/2000 | An et al. |
| 6,046,999 A | 4/2000 | Miki et al. |
| 6,078,595 A | 6/2000 | Jones et al. |
| 6,141,784 A | 10/2000 | Davis et al. |
| 6,144,667 A | 11/2000 | Doshi et al. |
| 6,147,988 A | 11/2000 | Bartholomew et al. |
| 6,172,990 B1 | 1/2001 | Deb et al. |
| 6,185,424 B1 | 2/2001 | Pon et al. |
| 6,246,879 B1 | 6/2001 | Segura et al. |
| 6,256,612 B1 | 7/2001 | Vo et al. |
| 6,272,358 B1 | 8/2001 | Brent et al. |
| 6,275,578 B1 | 8/2001 | De Trana et al. |
| 6,295,302 B1 | 9/2001 | Hellwig et al. |
| 6,298,055 B1 | 10/2001 | Wildfeuer |
| 6,324,409 B1 | 11/2001 | Shaffer et al. |
| 6,324,515 B1 | 11/2001 | Rabipour et al. |
| 6,339,594 B1 | 1/2002 | Civanlar et al. |
| 6,353,666 B1 | 3/2002 | Henderson et al. |
| 6,389,005 B1 | 5/2002 | Cruickshank |
| 6,389,016 B1 | 5/2002 | Sabaa et al. |
| 6,392,993 B1 | 5/2002 | Hamilton et al. |
| 6,414,964 B1 | 7/2002 | Holmquist et al. |
| 6,424,637 B1 | 7/2002 | Pecen et al. |
| 6,463,454 B1 | 10/2002 | Lumelsky et al. |
| 6,549,945 B1 | 4/2003 | Sinibaldi et al. |
| 6,553,423 B1 | 4/2003 | Chen |
| 6,574,469 B1 | 6/2003 | Xiang et al. |
| 6,600,738 B1 | 7/2003 | Alperovich et al. |
| 6,614,781 B1 | 9/2003 | Elliott et al. |
| 6,625,169 B1 | 9/2003 | Tofano |
| 6,647,428 B1 | 11/2003 | Bannai et al. |
| 6,658,064 B1 * | 12/2003 | Rotola-Pukkila et al. .... 375/295 |
| 6,671,367 B1 | 12/2003 | Graf et al. |
| 6,693,996 B2 | 2/2004 | Mansfield |
| 6,721,269 B2 | 4/2004 | Cao et al. |
| 6,731,627 B1 | 5/2004 | Gupta et al. |
| 6,731,647 B2 | 5/2004 | Yao |
| 6,765,931 B1 | 7/2004 | Rabenko et al. |
| 6,778,517 B1 | 8/2004 | Lou et al. |
| 6,781,983 B1 | 8/2004 | Armistead |
| 6,795,437 B1 | 9/2004 | Räsänen et al. |
| 6,842,461 B2 | 1/2005 | Harris |
| 6,845,089 B1 | 1/2005 | Gu et al. |
| 6,850,778 B1 | 2/2005 | Honkala et al. |
| 6,850,883 B1 | 2/2005 | Kapanen et al. |
| 6,865,220 B2 | 3/2005 | Abrishami |
| 6,876,646 B1 | 4/2005 | Dore et al. |
| 6,885,638 B2 | 4/2005 | Xu et al. |
| 6,898,208 B1 | 5/2005 | Sligo et al. |
| 6,944,166 B1 | 9/2005 | Perinpanathan et al. |
| 6,956,816 B1 | 10/2005 | Alexander et al. |
| 6,967,958 B2 | 11/2005 | Ono et al. |
| 6,967,972 B1 | 11/2005 | Volftsun et al. |
| 6,973,024 B1 | 12/2005 | Joseph et al. |
| 6,983,163 B2 | 1/2006 | Sato et al. |
| 6,985,530 B1 | 1/2006 | Zerbe |
| 6,990,340 B2 | 1/2006 | Tamura et al. |
| 6,999,459 B1 | 2/2006 | Callon et al. |
| 7,006,489 B2 | 2/2006 | Li et al. |
| 7,023,819 B2 | 4/2006 | Falsafi |
| 7,054,318 B2 | 5/2006 | Eneroth et al. |
| 7,054,320 B1 | 5/2006 | Lee et al. |
| 7,058,085 B2 | 6/2006 | Earnshaw et al. |
| 7,068,623 B1 | 6/2006 | Barany et al. |
| 7,072,358 B2 | 7/2006 | Suvanen |
| 7,082,143 B1 | 7/2006 | LeBlanc et al. |
| 7,085,289 B2 | 8/2006 | Cromer et al. |
| 7,089,011 B1 | 8/2006 | Mangal |
| 7,095,733 B1 | 8/2006 | Yarlagadda et al. |
| 7,103,021 B2 | 9/2006 | Jou |
| 7,106,701 B2 | 9/2006 | Stümpert et al. |
| 7,136,375 B1 | 11/2006 | Koistinen |
| 7,162,024 B2 | 1/2007 | Wah et al. |
| 7,180,892 B1 | 2/2007 | Tackin |
| 7,181,209 B2 | 2/2007 | Tamura |
| 7,203,226 B1 | 4/2007 | Rabipour et al. |
| 7,233,595 B1 | 6/2007 | Hollis et al. |
| 7,240,000 B2 | 7/2007 | Harada |
| 7,245,589 B2 | 7/2007 | Neulist et al. |
| 7,245,931 B2 | 7/2007 | Wang et al. |
| 7,280,530 B2 | 10/2007 | Chang et al. |
| 7,304,984 B2 | 12/2007 | Butler et al. |
| 7,305,229 B2 | 12/2007 | Fox et al. |
| 7,349,698 B2 | 3/2008 | Gallagher et al. |
| 7,369,859 B2 | 5/2008 | Gallagher |
| 7,400,881 B2 | 7/2008 | Kallio |
| 7,471,655 B2 | 12/2008 | Gallagher et al. |
| 7,483,374 B2 | 1/2009 | Nilakantan et al. |
| 7,593,415 B2 | 9/2009 | Li et al. |
| 7,639,601 B2 | 12/2009 | Rabipour et al. |
| 7,729,346 B2 | 6/2010 | Lee et al. |
| 2001/0024960 A1 | 9/2001 | Mauger |
| 2001/0036158 A1 | 11/2001 | Hallenstal et al. |
| 2001/0043577 A1 | 11/2001 | Barany et al. |
| 2002/0001302 A1 | 1/2002 | Pickett |
| 2002/0013147 A1 | 1/2002 | Fauconnier et al. |
| 2002/0019881 A1 | 2/2002 | Bokhari et al. |
| 2002/0027930 A1 | 3/2002 | Huh et al. |
| 2002/0049860 A1 | 4/2002 | Koistinen |
| 2002/0054571 A1 | 5/2002 | Falsafi |
| 2002/0072364 A1 | 6/2002 | Tamura |
| 2002/0106029 A1 | 8/2002 | Bunn et al. |
| 2002/0118673 A1 | 8/2002 | Abrishami et al. |
| 2003/0005106 A1 | 1/2003 | Isoda |
| 2003/0032440 A1 | 2/2003 | Sato et al. |
| 2003/0058822 A1 | 3/2003 | Jou |
| 2003/0063569 A1 | 4/2003 | Kalliokulju et al. |
| 2003/0072273 A1 | 4/2003 | Aiello et al. |
| 2003/0093509 A1 | 5/2003 | Li et al. |
| 2003/0112796 A1 | 6/2003 | Kwan |
| 2003/0117954 A1 | 6/2003 | De Neve et al. |
| 2003/0123466 A1 | 7/2003 | Somekh et al. |
| 2003/0123485 A1 | 7/2003 | Yi et al. |
| 2003/0133423 A1 | 7/2003 | LaDue |
| 2003/0134653 A1 | 7/2003 | Sarkkinen et al. |
| 2003/0135376 A1 | 7/2003 | Harada |
| 2003/0135784 A1 | 7/2003 | Yamaguchi et al. |
| 2003/0189270 A1 | 10/2003 | Bei et al. |
| 2003/0195981 A1 | 10/2003 | Graf et al. |
| 2003/0210659 A1 | 11/2003 | Chu et al. |
| 2003/0233274 A1 | 12/2003 | Urken et al. |
| 2004/0008652 A1 | 1/2004 | Tanzella et al. |
| 2004/0010582 A1 | 1/2004 | Oliver |
| 2004/0037224 A1 | 2/2004 | Choi et al. |
| 2004/0037314 A1 | 2/2004 | Spear |
| 2004/0047364 A1 | 3/2004 | Briggs et al. |
| 2004/0066745 A1 | 4/2004 | Joe |
| 2004/0073424 A1 | 4/2004 | Geppert et al. |
| 2004/0090989 A1 | 5/2004 | Kobayashi |
| 2004/0100914 A1 | 5/2004 | Hellwig et al. |
| 2004/0101125 A1 | 5/2004 | Graf et al. |
| 2004/0110539 A1 | 6/2004 | El-Maleh et al. |
| 2004/0114588 A1 | 6/2004 | Bhaskaran |
| 2004/0114626 A1 | 6/2004 | Cline et al. |
| 2004/0114922 A1 | 6/2004 | Hardee |
| 2004/0131025 A1 | 7/2004 | Dohler et al. |
| 2004/0131051 A1 | 7/2004 | Rabipour et al. |
| 2004/0133419 A1 | 7/2004 | El-Maleh et al. |
| 2004/0136447 A1 | 7/2004 | LeBlanc |
| 2004/0196867 A1 | 10/2004 | Ejzak et al. |
| 2004/0208132 A1 | 10/2004 | Neulist et al. |
| 2004/0228279 A1 | 11/2004 | Midtun et al. |
| 2004/0252681 A1 | 12/2004 | Rabipour et al. |
| 2004/0254786 A1 | 12/2004 | Kirla et al. |
| 2004/0266426 A1 | 12/2004 | Marsh et al. |
| 2004/0267897 A1 | 12/2004 | Hill et al. |
| 2005/0007973 A1 | 1/2005 | Jang et al. |
| 2005/0013281 A1 | 1/2005 | Milton et al. |
| 2005/0013286 A1 | 1/2005 | Holland et al. |
| 2005/0027948 A1 | 2/2005 | Marlan et al. |
| 2005/0048973 A1 | 3/2005 | Hou et al. |

| | | |
|---|---|---|
| 2005/0064907 A1 | 3/2005 | Nealon |
| 2005/0073977 A1 | 4/2005 | Vanghi et al. |
| 2005/0074017 A1 | 4/2005 | Qian et al. |
| 2005/0084094 A1 | 4/2005 | Gass et al. |
| 2005/0085181 A1 | 4/2005 | Tao |
| 2008/0740174 | 4/2005 | Qian et al. |
| 2005/0099940 A1 | 5/2005 | Ohenoja et al. |
| 2005/0105512 A1 | 5/2005 | Myhre et al. |
| 2005/0157823 A1 | 7/2005 | Sudhakar |
| 2005/0172013 A1 | 8/2005 | Tan et al. |
| 2005/0185604 A1 | 8/2005 | Agarwal |
| 2005/0195829 A1 | 9/2005 | Ward |
| 2005/0232232 A1 | 10/2005 | Farber et al. |
| 2005/0265279 A1 | 12/2005 | Markovic et al. |
| 2005/0267746 A1 | 12/2005 | Jelinek et al. |
| 2005/0286466 A1 | 12/2005 | Tagg et al. |
| 2006/0046658 A1 | 3/2006 | Cruz et al. |
| 2006/0050664 A1 | 3/2006 | Guey |
| 2006/0062225 A1 | 3/2006 | Li et al. |
| 2006/0067221 A1 | 3/2006 | Lee et al. |
| 2006/0072555 A1 | 4/2006 | St. Hilaire et al. |
| 2006/0092927 A1 | 5/2006 | Li et al. |
| 2006/0133353 A1 | 6/2006 | Wang et al. |
| 2006/0154686 A1 | 7/2006 | Sarkkinen et al. |
| 2006/0193289 A1 | 8/2006 | Ronneke et al. |
| 2006/0198347 A1 | 9/2006 | Hurtta et al. |
| 2006/0209873 A1 | 9/2006 | Knabchen et al. |
| 2006/0229068 A1 | 10/2006 | Niemela et al. |
| 2006/0268845 A1 | 11/2006 | He et al. |
| 2006/0286981 A1 | 12/2006 | Suumaki et al. |
| 2006/0291454 A1 | 12/2006 | Ali |
| 2006/0291483 A1 | 12/2006 | Sela |
| 2007/0011727 A1 | 1/2007 | Mielenz et al. |
| 2007/0041360 A1 | 2/2007 | Gallagher et al. |
| 2007/0043558 A1 | 2/2007 | Schwarz et al. |
| 2007/0123196 A1 | 5/2007 | Tamura |
| 2007/0127357 A1 | 6/2007 | Tamura |
| 2007/0127436 A1 | 6/2007 | Karimi-Cherkandi et al. |
| 2007/0135165 A1 | 6/2007 | Junghanns et al. |
| 2007/0140214 A1 | 6/2007 | Zoltan |
| 2007/0140293 A1 | 6/2007 | Agarwal et al. |
| 2007/0171841 A1 | 7/2007 | Witzel et al. |
| 2007/0186002 A1 | 8/2007 | Campbell et al. |
| 2007/0286082 A1 | 12/2007 | Hikspoors et al. |
| 2008/0008312 A1 | 1/2008 | Ganesamoorthi et al. |
| 2008/0039087 A1 | 2/2008 | Gallagher et al. |
| 2008/0102794 A1 | 5/2008 | Keevill et al. |
| 2008/0123596 A1 | 5/2008 | Gallagher et al. |
| 2008/0151845 A1 | 6/2008 | Jaakkola et al. |
| 2008/0225765 A1 | 9/2008 | Marinier et al. |
| 2008/0288245 A1* | 11/2008 | El-Maleh et al. ............ 704/201 |
| 2008/0293416 A1 | 11/2008 | Yi et al. |
| 2008/0316980 A1 | 12/2008 | Ahlen et al. |
| 2010/0305943 A1 | 12/2010 | Witzel et al. |

FOREIGN PATENT DOCUMENTS

| | | |
|---|---|---|
| CN | 1504039 A | 6/2004 |
| CN | 1 553 723 | 12/2004 |
| CN | 1553723 A | 12/2004 |
| DE | 198 29 822 A1 | 1/2000 |
| EP | 0 907 280 A2 | 4/1999 |
| EP | 1 017 217 A2 | 7/2000 |
| EP | 1 076 466 A1 | 2/2001 |
| FI | 20011715 | 2/2003 |
| GB | 2363295 | 12/2001 |
| GB | 2 389 486 A | 12/2003 |
| WO | WO 99/291326 | 6/1999 |
| WO | WO 99/40569 | 8/1999 |
| WO | WO 00/51330 | 8/2000 |
| WO | WO 00/70885 | 11/2000 |
| WO | WO 01/26390 A1 | 4/2001 |
| WO | WO 02/052414 A1 | 7/2002 |
| WO | WO 03/019961 A1 | 3/2003 |
| WO | WO 2004/019568 A2 | 3/2003 |
| WO | WO 03/043299 A1 | 5/2003 |
| WO | WO 03/103313 A1 | 12/2003 |
| WO | WO 2004/075582 A1 | 9/2004 |
| WO | WO 2005/050960 A1 | 6/2005 |
| WO | WO 2005/089055 | 9/2005 |

OTHER PUBLICATIONS

Interview Summary for U.S. Appl. No. 10/782,754 (Oct. 27, 2011).

Official Action for U.S. Appl. No. 10/782,754 (Sep. 28, 2011).

Supplementary European Search Report for European Patent No. 2 108 193 (May 19, 2011).

Final Official Action for U.S. Appl. No. 10/782,754 (Feb. 15, 2011).

Chinese Official Action for Chinese Patent Application No. 200780051814.6 (Oct. 27, 2010).

Official Action for U.S. Appl. No. 10/782,754 (Aug. 3, 2010).

Official Action for U.S. Appl. No. 10/782,754 (Feb. 26, 2010).

Official Action for U.S. Appl. No. 10/782,754 (Sep. 4, 2009).

"$3^{rd}$ Generation Partnership Project; Technical Specification Group Services and System Aspects; Comfort Noise Aspects for Enhanced Full Rate (EFR) Speech Traffic Channels (Release 7)," 3GPP TS 46.062 V7.0.0 (Jun. 2007).

"$3^{rd}$ Generation Partnership Project; Technical Specification Group Services and System Aspects; Enhanced Full Rate (EFR) Speech Transcoding (Release 7)," 3GPP TS 46.060 V7.0.0 (Jun. 2007).

$3^{rd}$ Generation Partnership Project; Technical Specification Group Services and System Aspects; Inband Tandem Free Operation (TFO) of Speech Codecs; Service Description; Stage 3 (Release 7) 3GPP TS 28.062 V7.0.0, pp. 1-183 (Jun. 2007).

Series G: Transmission Systems and Media, Digital Systems and Networks; Digital Terminal Equipments—Coding of Analogue Signals by Methods Other than PCM; Coding of Speech at 8 kbit/s Using Conjugate-Structure Algebraic-Code-Excited Linear Prediction (CS-ACELP), pp. 1-146 (Jan. 2007).

"$3^{rd}$ Generation Partnership Project; Technical Specification Group Core Network and Terminals; Core Network Nb Interface user Plane Protocols (Release 5)," 3GPP TS 29.415 V5.2.0, pp. 1-14 (Dec. 2006).

"Rationale for Reverse Direction Capability List," Study Group 16, ITU—Telecommunication Standardization Sector, Nortel Networks (Nov. 2005).

"Series H: Audiovisual and Multimedia Systems; Infrastructure of Audiovisual Servies—Communication Procedures; Gateway Control Protocol: Version 3," ITU-T H.248.1, pp. 1-206 (Sep. 2005).

"$3^{rd}$ Generation Partnership Project; Technical Specification Group Services and System Aspects; Vocabulary for 3GPP Specification (Release 7)," 3GPP TR 21.905 V7.0.0, pp. 1-54 (Sep. 2005).

"Third Generation Partnership Project; Technical Specification Group Core Network and Terminals; Interworking Between the IP Multimedia (IM) Core Network (CN) Subsystem and Circuit Switched (CS) Networks (Release 6)" 3GPP TS 29.163, pp. 1-128 (Jun. 2005).

Agilent Technologies, "UMTS Network and Service Assurance," International Engineering Consortium, http://www.iec.org/online/tutorials/agilent_umts_network/topic03.html, pp. 1-4 (Copyright 2005).

"Digital Cellular Telecommunications System Phase (2+); Universal Mobile Telecommunications System (UMTS); AMR Speech Codec, Wideband; Interface to lu and Uu (3GPP TS 26.202 version 6.0.0 Release 6)," Global System for Mobile Communications ETSI TS 126 202, pp. 1-14 (Dec. 2004).

"Digital Cellular Telecommunications System (Phase2+); Universal Mobile Telecommunications System (UMTS) Inband Tandem Free Operation (TFO) of Speec Codecs," (Dec. 2004), ETSI TS 128 062 v. 6.1.0, European Telecommunications Standards Institute (Dec. 2004).

$3^{rd}$ Generation Partnership Project; Technical Specification Group Services and System Aspects; Mandatory Speech Codec Speech Processing Functions; Adaptive Multi-Rate (AMR) Speech Codec Frame Structure (Release 6), 3GPP TS 26.101 V6.0.0, pp. 1-20 (Sep. 2004).

International Search Report and Written Opinion of PCT/CA2004/000300 mailed on Jul. 15, 2004.

"Series G: Transmission Systems and Media, Digital Systems and Networks," ITU-T, G.161, International Telecommunication Union (Jun. 2004).

R.L. Bunting (Editor), "Transcoder Free Operation," $3^{rd}$ Generation Partnership, Version 1.0, Project 2 (Mar. 18, 2004).

Partial International Search Report, PCT/CA03/00972 (Nov. 3, 2003).

Yoo et al., "A Media Stream Processing of VoIP Media Gateway," IEEE, p. 91-94 (Copyright 2003).

"3rd Generation Parnetship Project, Technical Specification Group Radio Access Network; UTRAN lu Interface User Plane Protocols (Release 4)," 3GPP TS 25.415 V4.7.0, pp. 1-62 (Dec. 2002).

Sjoberg et al., "Real-Time Transport Protcol (RTP) Payload Format and File Storage Format for the adaptive Multi-Rate (AMR) and Adaptive Multi-Rate Wideband (AMR-WB) Audio Codecs," Network Working Group, http://www.apps.ietf.org/rfc/rfc3267html, pp. 1-48 (Jun. 2002).

ETSI: Digital Cellular Telecommunication System (Phase 2+) (GSM); Universal Mobile Telecommunications System (UMTS): Inband Tandem Free Operation (TFO) of Speech Codecs; Service Description; Stage 3 (3GPP TS 28.062 version 5.0.0 Release 5) ETSI TS 28 062 V5.0.0, xx,xx, Mar. 2002, pp. 14-19, 35-51, 56-59, 81-88, 164-168, XP002248624.

"3rd Generation Partnership Project; Technical Specification Group Core Network; Bearer-independent Circuit-Switched Core Network; Stage 2 (Release 4)," 3GPP TS 23.205 V4.4.0, pp. 1-183 (Mar. 2002).

"3rd Generation Partnership Project; Technical Specification Group Services and System Aspects; Inband Tandem Free Operation (TFO) of Speech Codecs; Service Description; Stage 3 (Release 5)," 3GPP TS 28.062 V5.0.0, pp. 1-175 (Mar. 2002).

"Implementing Media Gateway Control Protocols," RADVision, pp. 1-16 (Jan. 27, 2002).

"3rd Generation Partnership Project; Technical Specification Group Core Network; Out of Band Transcoder Control—Stage 2; (Release 4)," 3GPP TS 23.153 V4.4.0 Release 4, pp. 1-45 (Dec. 2001).

ETSI TS 128 062 V4.2.0 (2001-12) Technical Specification; Digital Cellular Telecommunications System (Phase 2+) (GSM); Universal Mobile Telecommunications System (UMTS); Inband Tandem Free Operation (TFO) of Speech Codecs; Service Description; Stage 3 (3GPP TS 28.062 version 4.2.0 Release 4).

"3rd Generation Partnership Project; Technical Specification Group (TSG) RAN3; Transcoder Free Operation (Release 4)," 3GPP TR 25.953 V4.0.0, pp. 1-15 (Mar. 2001).

Third Generation Partnership Project; Meeting Report v3.0.0, 3GPP TSG-TrFO Workshop#04, pp. 1-18 (Oct. 17-19, 2000).

"Series G: Transmission Systems and Media, Digital Systems and Networks; Digital Transmission Systems—Terminal Equipments—Coding of Analogue Signals by Pulse Code Modulation," ITU-T G.711, Appendix II, pp. 1-18 (Feb. 2000).

ETSI: "Digital Cellular Telecommunications System (Phase2+): Inband Tandem Free Operation (TFO) of Speech Codecs; Service Description; Stage 3 (GSM 04.53 version 1.6.0)" GSM Global System for Mobile Telecommunications, Online, Oct. 1998, pp. 1-69, XP002283034.

"General Aspects of Digital Transmission Systems; Terminal Equipments; Pulse Code Modulation (PCM) of Voice Frequencies," ITU-T G.711, pp. 1-12 (Nov. 1988).

Communication pursuant to Rules 70(2) and 70a(2) EPC for European application No. 07868090.7 (Jun. 7, 2011).

\* cited by examiner

2G GSM_EFR_SID

| MSB – LSB | W | FIELD NAME |
|---|---|---|
| S1 – S38 | 38 | SID PAYLOAD |
| S39 – S91 | 53 | SUB-FRAME 1 |
| S92 – S141 | 50 | SUB-FRAME 2 |
| S142 – S194 | 53 | SUB-FRAME 3 |
| S195 – S244 | 50 | SUB-FRAME 4 |

SID PAYLOAD

| S1 – S7 | 7 | INDEX OF 1ST LSF SUBMATRIX |
|---|---|---|
| S8 – S15 | 8 | INDEX OF 2ND LSF SUBMATRIX |
| S16 – S23 | 8 | INDEX OF 3RD LSF SUBMATRIX |
| S24 | 1 | SIGN OF 3RD LSF SUBMATRIX |
| S25 – S32 | 8 | INDEX OF 4TH LSF SUBMATRIX |
| S33 – S38 | 6 | INDEX OF 5TH LSF SUBMATRIX |

SUB-FRAME 1

| S39 – S47 | 9 | ADAPTIVE CODEBOOK INDEX |
|---|---|---|
| S48 – S51 | 4 | ADAPTIVE CODEBOOK GAIN |
| S52 | 1 | SIGN OF 1ST AND 6TH PULSES |
| S53 – S55 | 3 | POSITION OF 1ST PULSE |
| S56 | 1 | SIGN OF 2ND AND 7TH PULSES |
| S57 – S59 | 3 | POSITION OF 2ND PULSE |
| S60 | 1 | SIGN OF 3RD AND 8TH PULSES |
| S61 – S63 | 3 | POSITION OF 3RD PULSE |
| S64 | 1 | SIGN OF 4TH AND 9TH PULSES |
| S65 – S67 | 3 | POSITION OF 4TH PULSE |
| S68 | 1 | SIGN OF 5TH AND 10TH PULSES |
| S69 – S71 | 3 | POSITION OF 5TH PULSE |
| S72 – S74 | 3 | POSITION OF 6TH PULSE |
| S75 – S77 | 3 | POSITION OF 7TH PULSE |
| S78 – S80 | 3 | POSITION OF 8TH PULSE |
| S81 – S83 | 3 | POSITION OF 9TH PULSE |
| S84 – S86 | 3 | POSITION OF 10TH PULSE |
| S87 – S91 | 5 | FIXED CODEBOOK GAIN |

| SUB-FRAME 2 | S92 – S97 | 6 | ADAPTIVE CODEBOOK INDEX (RELATIVE) |
|---|---|---|---|
| | S98 – S141 | 8 | SAME DESCRIPTION AS BITS S48 – S91 |
| SUB-FRAME 3 | S142 – S194 | 8 | SAME DESCRIPTION AS BITS S39 – S91 |
| SUB-FRAME 4 | S195 – S244 | 8 | SAME DESCRIPTION AS BITS S92 – S141 |

METHODS, SYSTEMS, AND COMPUTER PROGRAM PRODUCTS FOR SILENCE INSERTION DESCRIPTOR (SID) CONVERSION

PRIORITY CLAIM

This application claims the benefit of U.S. Provisional Patent Application Ser. No. 60/877,439, filed Dec. 28, 2006; the disclosure of which is incorporated herein by reference in its entirety.

TECHNICAL FIELD

The subject matter described herein relates to methods and systems for enhancing the quality of voice calls across mixed-generation wireless networks by obviating, in some circumstances, the need for transcoding and thus avoiding the attendant reduction of voice quality. More particularly, the subject matter described herein relates to methods, systems, and computer program products for silence insertion descriptor (SID) conversion.

BACKGROUND

As wireless communications networks become more pervasive and the number of subscribers continues to increase, wireless bandwidth becomes increasingly scarce. To mitigate this problem, advanced voice compression techniques are used to reduce the bandwidth needed by each voice call. For example, a standard 8-bits per data, 8000 samples per second voice coding, such as 64 kbits/s, may be reduced to 8 kbits/s or less via coder/decoders (codecs) such as the GSM (Global System for Mobile communication) AMR (Adaptive Multi-Rate) and EFR (Enhanced Full Rate) codecs and the CDMA (Code Division Multiple Access) EVRC (Enhanced Variable Rate Codec). Codecs typically operate on a collection of samples, which are compressed and sent as a frame of data. Some codecs, for example, divide a voice call into 20 ms time slices, sending a frame of data every 20 ms.

Some voice codecs define not only a speech compression algorithm but also a silence compression algorithm. It has been estimated that fifty percent or more of a typical telephone conversation is silence—i.e., the part of the conversation during which neither party is speaking. During these periods of silence, transmitting the background noise detected by the cell phone's microphone would be an unnecessary use of network bandwidth, since the silence (e.g., the background noise) has no information content. However, sending no information during periods of silence has the undesirable side-effect of causing the receiving party to wonder, due to the lack of any sound coming from the sender's phone, whether the sender has hung up or terminated the call.

Therefore, many codecs detect the background noise present at the near-end device and characterize it, such as determining its pitch and volume, and transmit the characterization parameters to the far-end device. At the far-end device, the noise parameters are used to generate a slight background noise, such as soft white noise, recreate the background noise at the near-end device and thus convey the continued presence of the other party on the line. GSM_EFR codecs send what is called a silence insertion descriptor (SID) to the far-end codec. The far-end codec generates natural background noise for the call based on parameters within the received SID frame. Example parameters within the SID frame include line spectral frequency (LSF) and energy gain. With these two pieces of information, roughly equivalent to the pitch and volume of the background noise, respectively, the receiving end is able to recreate the background sound. These SID frames are sent relatively infrequently compared to speech frames. In some codecs, the SID frames are sent at call initiation and again only when the character of the near-end background noise changes significantly.

While the clear advantage to using voice compression is that it uses less bandwidth per call, the disadvantage of using voice compression is that it introduces signal distortion. Whenever a signal is transcoded, or converted from one format to another, there is a potential for introduction of signal distortion. Transcoding refers not only to compression but also to compression/expansion ("companding") operations, such as A-law and mu-law encoding/decoding. As shown below, in a typical mobile-to-mobile call there may be many transcoding steps, each of which having the potential to degrade the voice quality of the call.

Figure 1:
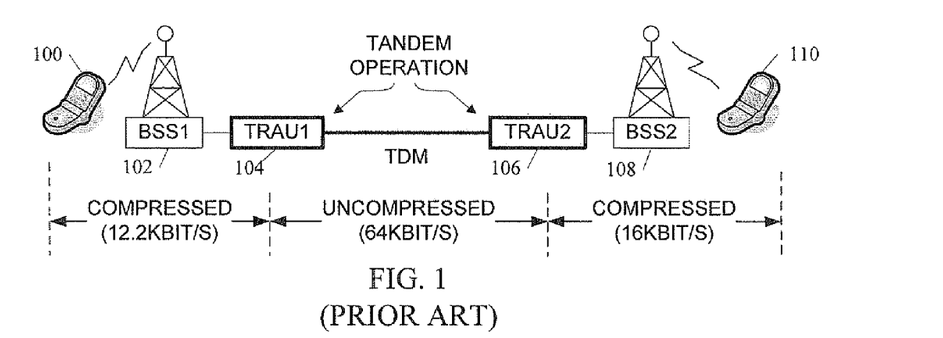
FIG. 1 is a block diagram illustrating a conventional mobile-to-mobile call.

FIG. 1 is a block diagram illustrating a conventional mobile-to-mobile call. Caller's cell phone 100 is connected via a radio frequency (RF) interface to the nearest cell phone tower and associated base station subsystem (BSS1 102). Caller's cell phone 100 typically uses a voice encoder to compress caller's voice from 64~128 kbit/s to 12.2 kbit/s, for example, before transmitting the compressed speech data to the BSS1 102. BSS1 102 provides the interface between the RF network and the wireline network. BSS1 102 may send the speech data to a transcoded rate adaptive unit (TRAU1 104), which may decode the compressed speech data into uncompressed 8~16 bit per sample, 8000 sample per second audio data. TRAU1 104 may transmit the uncompressed data across the network, as shown in FIG. 1, but typically it will re-encode the uncompressed voice data using a compression/expansion algorithm, such as A-law or mu-law, to boost the signal-to-noise ratio of the signal being transmitted, creating a 64 kbits/s PCM G.711 data stream. In other words, TRAU1 104 may transcode the voice data from one encoding format to another, such as from 3G_GSM_AMR to G.711. TRAU1 104 may forward the speech data across the phone network to TRAU2 106. TRAU2 106 may transcode the speech data into the compressed format used by the destination network. For example, TRAU2 106 may convert the speech data from G.711 to 2G_GSM_EFR. TRAU2 106 may send the transcoded speech data to the destination network's base station subsystem, BSS2 108. BSS2 108 may transmit the re-encoded speech data to Callee's cell phone 110.

In summary, the voice data may be encoded (and decoded) several times along the path between caller's cell phone 100 and callee's cell phone 110: encoding using the source codec by caller's cell phone 100, encoding using the intermediate codec by TRAU1 104, and encoding using the destination codec by TRAU2 106. Since both TRAU1 104 and TRAU2 106 must agree on an intermediate format, which may be 64 kbit/s mu-law PCM data, for example, TRAU1 104 and TRAU2 106 are said to be operating in tandem, and are commonly referred to as being a tandem pair.

As used herein, the term "internal format" refers to the intermediate format which the tandem pair uses to communicate data with each other, and the term "external format" refers to the format that each member of the tandem pair uses to communicate data with its respective network. The respective external formats may incompatible, as can be seen in FIG. 1, in which the external format for TRAU1 104 achieves a compression of 12.2 kbits per second, while the external format TRAU2 106 achieves a compression of 16 kbits per second.

Figure 2:
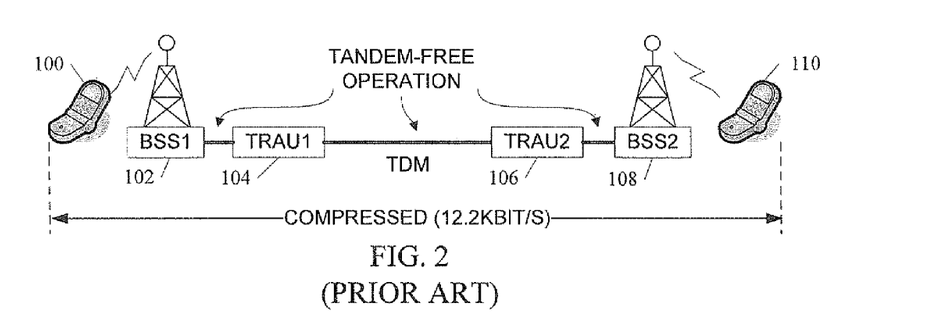
FIG. 2 is a block diagram illustrating a conventional mobile-to-mobile call using tandem-free operation.

Each encoding step—by caller's cell phone 100, BSS1 102, and BSS2 108—may introduce additional signal distortion, which degrades the overall quality of the voice call. One way to avoid the degradation of voice signal quality in a mobile-to-mobile scenario is to reduce the number of transcoding steps performed. For example, if the external format used by the caller's base station is the same or compatible with the external format used by the callee's base station, there may be no need to transcode to an intermediate format. In other words, there may be no need for a tandem pair to perform transcoding. Operation in such a mode is commonly referred to as "tandem-free operation", or TFO. FIG. 2 illustrates an example of a network operating in TFO mode. In conventional systems, two codecs are the same or compatible if they use the same speech and silence compression algorithms and the same bit rates.

FIG. 2 is a block diagram illustrating a conventional mobile-to-mobile call using tandem-free operation. As stated above, TFO mode is possible only if the two mobile networks use the same or compatible external format. Thus, in FIG. 2 the codec used by BSS1 102 to communicate with caller's cell phone 100 is the same as, or compatible with, the codec used by BSS2 108 to communicate with callee's cell phone 110. For example, BSS1 102 and BSS2 108 may use codecs that use the same speech and silence compression algorithms and same bit rate. In this case, it is unnecessary for TRAU1 104 to transode the speech data into an internal format, such as G.711, before sending the speech data across the network to TRAU2 106, and vice versa. Instead, TRAU1 104 and TRAU2 106 may send the speech data to without transcoding, avoiding two transcoding steps. Furthermore, BSS2 108 may transmit the encoded speech data over its RF interface directly to the callee's mobile phone, thus avoiding two additional transcoding steps: the transcoding of data as it passes from the radio interface to the wired network interface in each of the respective wireless networks. In summary, by not transcoding voice data to and from an intermediate format (i.e., G.711), degradation of voice quality due to introduced signal distortion is avoided. The TFO principle may apply anywhere along the network path in which transcoding to an internal codec may be eliminated by agreement between nodes that use the same external codec.

For TFO to work, however, additional requirements must be met. One requirement is that the nodes or network entities be able to support TFO, which means that the nodes need be able to communicate with each other regarding the TFO stream. For example, the nodes may need to negotiate a TFO link, monitor link status, or provide fallback procedures in case of TFO interruption. Typically, in-band signaling is used for communication of TFO messages, since the compressed voice data stream uses a fraction of the bandwidth and thus makes bits available for a control channel. A common practice is to map the control channel onto the least significant bit or bits of the 8-bit, 64 kbit/s channel. This causes only a slight degradation of quality of uncompressed voice data, and causes no degradation of quality of the compressed voice data. Thus, the bearer channel must support in-band signaling. Another requirement is that external codecs should be the same or likewise compatible; otherwise, any benefit to skipping the intermediate transcoding step may be reduced by the need to convert from one external codec to another external codec.

Figure 3:
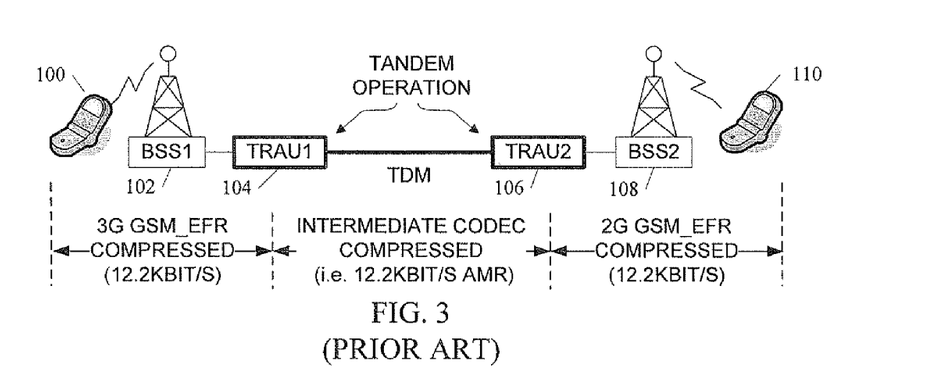
FIG. 3 is a block diagram illustrating a conventional mobile-to-mobile call that crosses the boundary between 2G and 3G wireless networks.

An additional challenge is raised when attempting to implement TFO for a mobile-to-mobile voice call that crosses a boundary between 2G wireless networks and 3G wireless networks: there may be a difference between the 2G version of a codec and its 3G equivalent. FIG. 3 illustrates such an example.

FIG. 3 is a block diagram illustrating a conventional mobile-to-mobile call that crosses the boundary between 2G and 3G wireless networks. Although BSS1 102 and BSS2 108 both use the GSM_EFR (enhanced full rate) codec, BSS1 102 is a 3G network, and therefore uses the 3G version of the GSM_EFR codec, while BSS2 108 is a 2G mobile network, and therefore uses the 2G version of the GSM_EFR codec. Although the 2G and 3G versions of the GSM_EFR codec have the same 12.2 kbits/s rate for voice compression, their silence insertion description frames are incompatible. To address this incompatibility, conventional networks perform at least one transcoding operation, from 3G_GSM_EFR to 2G_GSM_EFR and vice versa. In practice, conventional systems, such as the one shown in FIG. 3, will perform not one but two transcoding operations, into and out of the preferred or native format used by the network backbone. In FIG. 3, for example, TRAU1 104 and TRAU2 106 may operate in tandem to transcode into and out of a common internal codec format such as the 12.2 kbit/s AMR format. Thus, although the 2G_GSM_EFR and 3G_GSM_EFR codecs are essentially identical, the incompatible silence insertion description frames prevent efficient mobile to mobile communication, which introduces distortion into the call.

Figure 4:
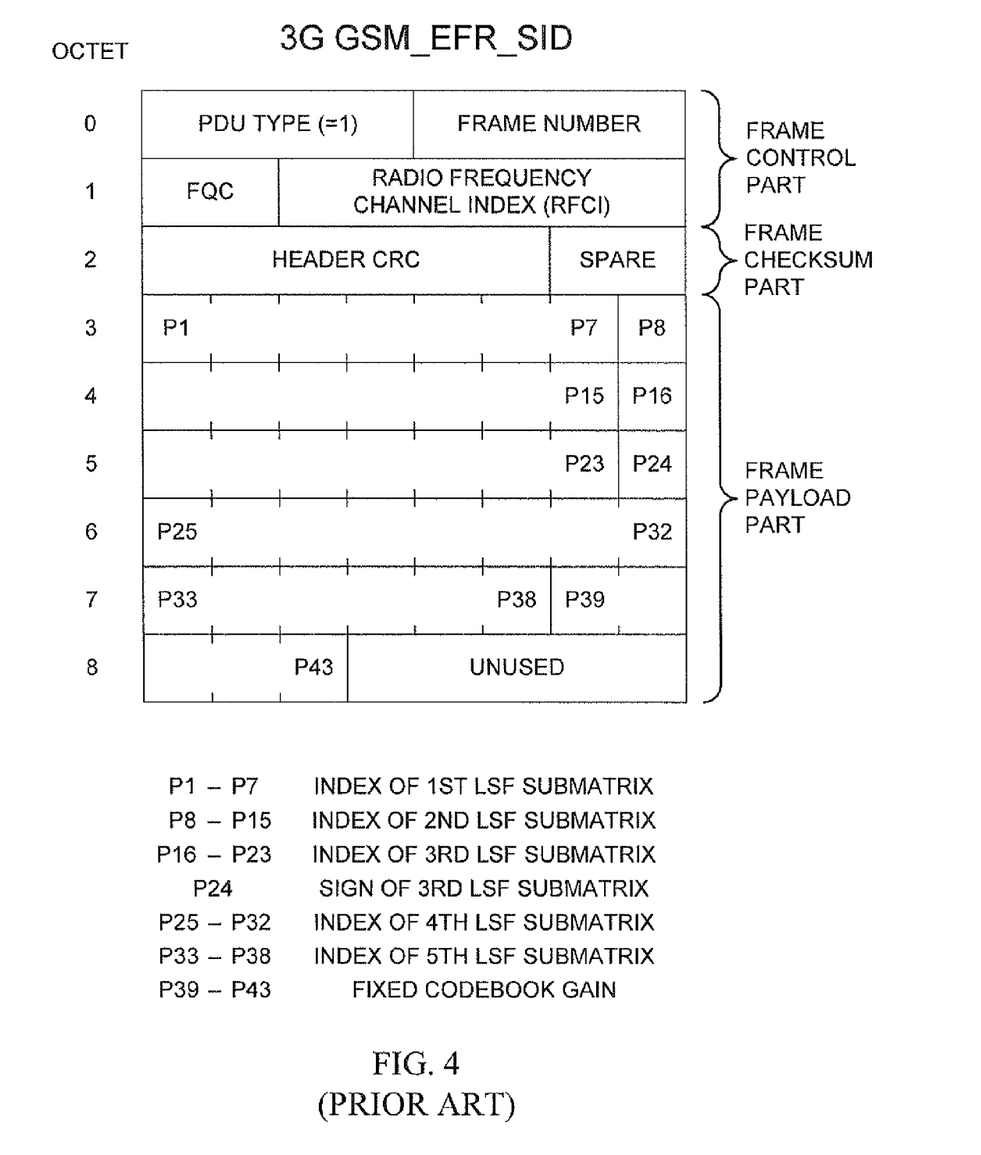
FIG. 4 illustrates the general frame format for a conventional 3G EFR frame.

FIG. 4 illustrates the general frame format for a conventional 3G EFR frame. The radio frequency channel index (RFCI) field indicates the type of frame. An RFCI value of "3" indicates that the frame is a SID frame. For a SID frame, the LSF and energy gain data will be contained in the frame payload part, which starts at octet 3.

Figure 5:
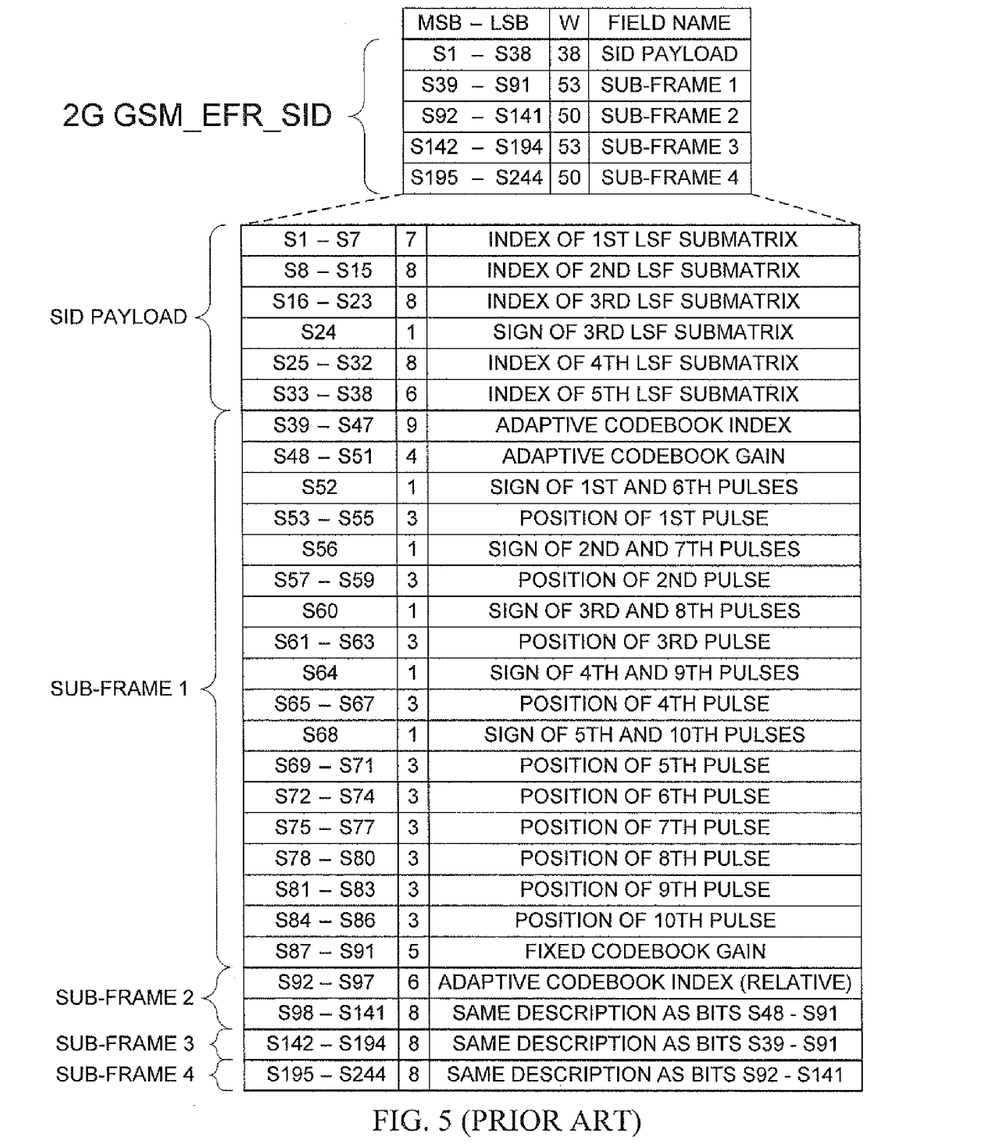
FIG. 5 illustrates the general frame format for a conventional 2G EFR frame.

FIG. 5 illustrates the general frame format for a conventional 2G EFR frame. A 2G EFR frame includes a payload field and four subframes. The LSF data is located in the payload field, in bits 1-38. The energy gain data is located in sub-frame 1, in bits 87-91. For a 2G EFR SID frame, subframes 2 through 4 do not contain any SID-specific information.

Unlike the 3G version of an EFR frame, the 2G EFR frame does not include a frame type field. Rather, a SID frame type is indicated by a particular bit pattern of sub-frame 1. The particular bit pattern is also called a frame signature. The frame signature must be analyzed in order to determine whether an incoming 2G EFR frame is a SID frame.

As can be seen from FIG. 5 and FIG. 4, the 2G GMS SID frame is 244 bits long, while the 3G UMTS SID frame is 43 bits long. This incompatibility is significant enough to prevent tandem-free operation between two otherwise compatible codecs. Referring back to FIG. 3, the incompatibility of the SID frames may force TRAU1 104 and TRAU2 106 to operate in tandem mode and use an intermediate format, such as a 12.2 kbit/s AMR. Thus, in a mobile-to-mobile voice call between a 2G network and a 3G network, tandem-free operation may not be possible, and the benefits of TFO, such as increased voice quality, may be unavailable.

Thus, there is a need for a way to enable TFO operation between 2G and 3G networks that use codecs with similar speech compression algorithms and bit rates but which have dissimilar SID frame formats. In particular, there is a need for methods, systems, and computer program products for silence insertion descriptor (SID) conversion.

SUMMARY

According to one aspect, the subject matter described herein includes a method for silence insertion descriptor (SID) conversion. The method includes receiving a wireless frame, the frame identifying a first node as a frame source and a second node as a frame destination; determining whether tandem-free operation (TFO) is applicable; responsive to a determination that TFO is applicable, determining whether the frame is a SID frame; responsive to a determination that the frame is a SID frame, determining whether the SID format used by the first node is incompatible with the SID format used by the second node; and responsive to a determination that the SID format used by the first node is incompatible with the SID format used by the second node, converting the SID frame from the SID format used by the first node to the SID format used by the second node.

As used herein, the term "wireless frame" refers to data that originates from a device in a wireless mobile network, is organized into a frame, and contains voice or other media traffic. Voice traffic data may include both active speech (i.e., when at least one party is talking) and silence (i.e., when no party is talking), and may be compressed or uncompressed.

According to another aspect, the subject matter described herein includes a method for silence insertion descriptor (SID) conversion. The method includes receiving a wireless frame, the frame identifying a first node as a frame source and a second node as a frame destination; identifying a first codec used by the first node and a second codec used by the second node, and determining whether one of the first and second codecs comprise a second generation global system for mobile enhanced full rate (2G_GSM_EFR) codec and the other of the first and second codes comprises a third generation global system for mobile enhanced full rate (3G_GSM_EFR) codec; responsive to a determination that the codecs comprise a 2G_GSM_EFR codec and a 3G_GSM_EFR codec, determining whether the frame is a SID frame; responsive to a determination that the frame is a SID frame, determining whether the SID format used by the first node is incompatible with the SID format used by the second node; responsive to a determination that the SID format used by the first node is incompatible with the SID format used by the second node, converting the frame from the SID format used by the first node to the SID format used by the second node and sending the converted SID frame to the second node.

According to yet another aspect, the subject matter described herein includes a system for silence insertion descriptor (SID) conversion. The system includes a control module for receiving a wireless frame, the frame identifying a first node as a frame source and a second node as a frame destination, and for determining whether tandem-free operation (TFO) is applicable. The system also includes a SID conversion module, operatively associated with the control module, for determining whether the frame is a SID frame, and, responsive to a determination that the frame is a SID frame, determining whether a SID format used by the first node is incompatible with a SID format used by the second node, and, responsive to a determination that the SID format used by the first node is incompatible with the SID format used by the second node, converting the frame from the SID format used by the first node to the SID format used by the second node and sending the converted frame to the second node.

The subject matter described herein for silence insertion description conversion may be implemented in software in combination with hardware and/or firmware. As such, the term "module" as used herein refers to software in combination with hardware and/or firmware for implementing the feature being described. In one exemplary implementation, the subject matter described herein may be implemented using a computer program product comprising computer executable instructions embodied in a non-transitory computer readable medium.

Exemplary computer readable media suitable for implementing the subject matter described herein include non-transitory devices, such as disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

In accordance with the subject matter disclosed herein, methods, systems, and computer program products for silence insertion descriptor (SID) conversion are provided. Where a mobile-to-mobile call spans mobile networks that use the same or compatible speech compression algorithms and bit rates but incompatible silence insertion descriptors, an intermediate transcoding step is avoided by efficiently detecting SID frames in the format used by the source network, extracting the SID information contained within the incoming SID frames, and using the extracted information to create outgoing SID frames of a format used by the destination network. Speech frames may simply be forwarded without transcoding. By avoiding transcoding into an intermediate format, distortion otherwise caused by those transcoding steps is eliminated, improving the sound quality of the call.

Figure 6:
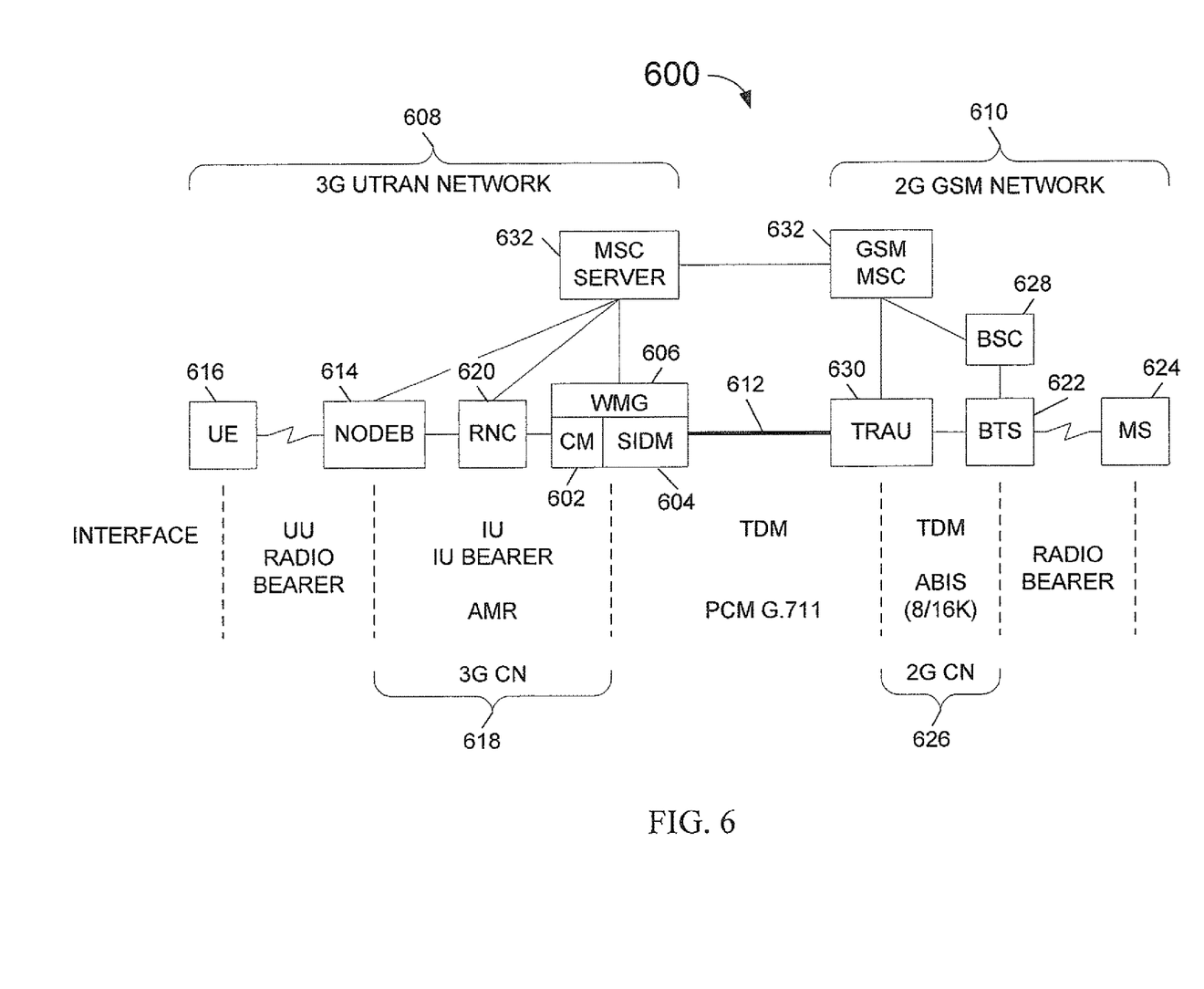
FIG. 6 is a block diagram illustrating an exemplary system for silence insertion descriptor (SID) conversion in accordance with an embodiment of the subject matter described herein.

FIG. 6 is a block diagram illustrating an exemplary system for silence insertion descriptor (SID) conversion in accordance with an embodiment of the subject matter described herein. In one embodiment, system 600 may contain a control module 602 for receiving a wireless frame, the frame identifying a first node as a frame source and a second node as a frame destination, and a SID conversion module 604, operatively associated with control module 602, for determining whether tandem-free operation (TFO) is applicable, and, responsive to a determination that TFO is applicable, determining whether the frame is a SID frame, and, responsive to a determination that the frame is a SID frame, determining whether a SID format used by the first node is incompatible with a SID format used by the second node, and, responsive to a determination that the SID format used by the first node is incompatible with the SID format used by the second node, converting the frame from the SID format used by the first node to the SID format used by the second node and sending the converted frame to the second node.

In one embodiment, control module 602 and SID conversion module 604 may be components of a wireless media gateway WMG 606 for communicating messages between a packet-based mobile wireless network MWN1 608 and a TDM-based mobile wireless network MWN2 610 via a TDM trunk 612.

In one embodiment, MWN1 608 may be a 3G UMTS terrestrial radio access network (UTRAN), including a UMTS base transceiver station (BTS), referred to as a NodeB 614, for providing a radio communications link between mobile user equipment 616 and the 3G core network 618. A radio network controller RNC 620 manages a group of NodeBs.

In one embodiment, MWN2 610 may be a 2G GSM network, including a base transceiver station (BTS 622) for providing a radio communications link between mobile stations 624 and the 2G core network 626. A base station controller (BSC 628) manages a group of BTSs. MWN2 610 may include a transcoding rate adapter unit TRAU 630 for transcoding from a codec format used by TDM trunk 612 into a codec format used by MWN2 610. Furthermore, each wireless network may have one or more mobile switching centers (MSC 632) which handle the signaling messages for call setup.

In addition to converting messages from packet to TDM format, WMG 606 may also transcode messages. For example, MWN1 608 may use a codec, such as a 3G GSM AMR or EFR codec, to compress bearer data transmitted within 3G core network 618, in which case WMG 606 may need to transcode the compressed data into an uncompressed format, such as PCM data, and optionally transcode again into a format such as G.711, which uses a companding algorithm, such as A-law or mu-law, to improve the signal to noise ratio of data transmitted across TDM trunk 612. Similarly, TRAU 630 may transcode the PCM G.711 data into uncompressed PCM data, and then recompress the data using a codec used by MWN2 610, such as Abis or 2G GSM EFR.

Because SID conversion module 604 is capable of converting between incompatible SID formats, WMG 606 and TRAU 630 may enter into a tandem-free operation (TFO) mode; in this case, WMG 606 may convert wireless frames from packet format to TDM format without transcoding into an intermediate codec format used by TDM trunk 612, and TRAU 630 may similarly avoid the transcoding step and simply pass the wireless frames through to BTS 622 without modification.

In conventional systems, WMG 606 and TRAU 630 would not be able to enter TFO mode if the codec used by MWN1 608 and MWN2 610 are the 3G and 2G versions, respectively, of the GSM EFR codec. Here, however, TFO mode may be taken advantage of if the respective codecs have the same speech compression algorithm and bit rate, but the formats of their respective SID frames differ, as is the case with the GSM EFR codecs. The operation of system 600 will now be described.

Figure 7:
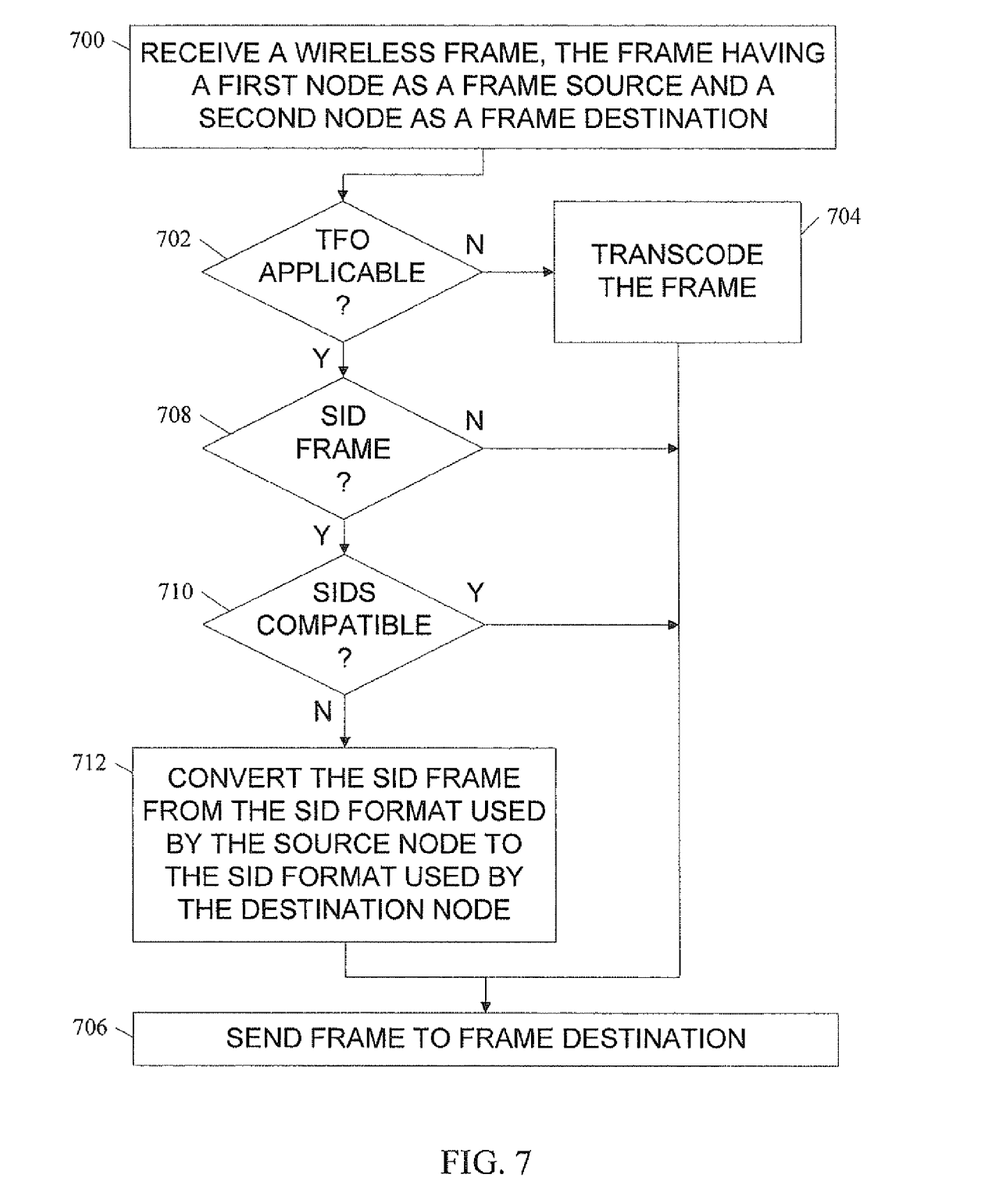
FIG. 7 is a flow chart illustrating an exemplary process for silence insertion descriptor conversion in accordance with an embodiment of the subject matter described herein.

FIG. 7 is a flow chart illustrating an exemplary process for silence insertion descriptor conversion in accordance with an embodiment of the subject matter described herein.

At block 700, a wireless frame is received, the frame identifying a first node as a frame source and a second node as a frame destination. For example, WMG 606 may receive a wireless frame that originates from caller 616 and is intended for callee 624.

At block 702, it is determined whether tandem-free operation (TFO) is applicable or not. For example, as part of the call setup, RNC 620 and its TFO peer, TRAU 630, may exchange information about the codecs supported by the respective networks MWN1 608 and MWN2 610, through signaling messages sent via MSCs 632. To determine whether TFO is applicable, control module 602 may determine whether the speech compression algorithms and bit rates of the respective codecs are the same. For example, at call setup, WMG 606 may analyze call setup signaling messages to identify codecs used by the incoming and outgoing call legs in order to determine whether the codecs are the same or compatible. If so, WMG 606 may store an indication that TFO is applicable, and control module 602 may read this indication to determine whether or not TFO is applicable. Alternatively, SID conversion module 604 may read this indication to determine whether or not TFO is applicable. This process is described in more detail in FIG. 9, below. If TFO is not applicable, the process moves to block 704, in which the frame may be transcoded into an intermediate format used by TDM trunk 612, and then to block 706, in which the frame, transcoded in this case, is sent to the frame destination. However, if TFO is applicable, the process moves to block 708.

At block 708, it is determined whether the wireless frame is a SID frame. For example, if the received frame is a 43-bit 3G_GSM_EFR frame, SID conversion module 604 may look for a value of "3" in the radio frequency channel index (RFCI) field of the frame, indicating a 3G SID frame. On the other hand, if the received frame is a 244-bit 2G_GSM_EFR frame, SID conversion module 604 may look for a specific pattern of 95 bits in the frame set to "1", indicating that the frame is a 2G SID frame. If the wireless frame is not a SID frame, the process moves to block 706, in which the frame is sent, without transcoding, to the frame destination. However, if the frame is a SID frame, the process moves to block 710.

At block 710, it is then determined whether the format of a SID frame used by the first node is incompatible with the SID format used by the second node. For example, SID conversion module 604 may maintain information about the call from caller 616 to callee 624, including information about the codec formats negotiated between RNC 620 and BSC 628, and use that information to determine whether the SID formats are compatible or not. In one embodiment, the first and second nodes may be the respective air interfaces NodeB 614 and BTS 622. Alternatively, the first and second nodes may be the mobile devices themselves, UE 616 and MS 624. If the SID frame formats are compatible, the process moves to block 706, in which the SID frame is sent, without conversion, to the frame destination. However, if the SID frame formats are incompatible, the process moves to block 712.

At block 712, the SID frame is converted from the SID format used by the first node to the SID format used by the second node. For example, if SID conversion module 604 determines that the SID formats are incompatible, it may use the procedure illustrated in FIG. 8, below, to convert the SID frame from into a format used by the destination node. The process then moves to block 706, in which the converted SID frame is sent to the frame destination.

Figure 8:
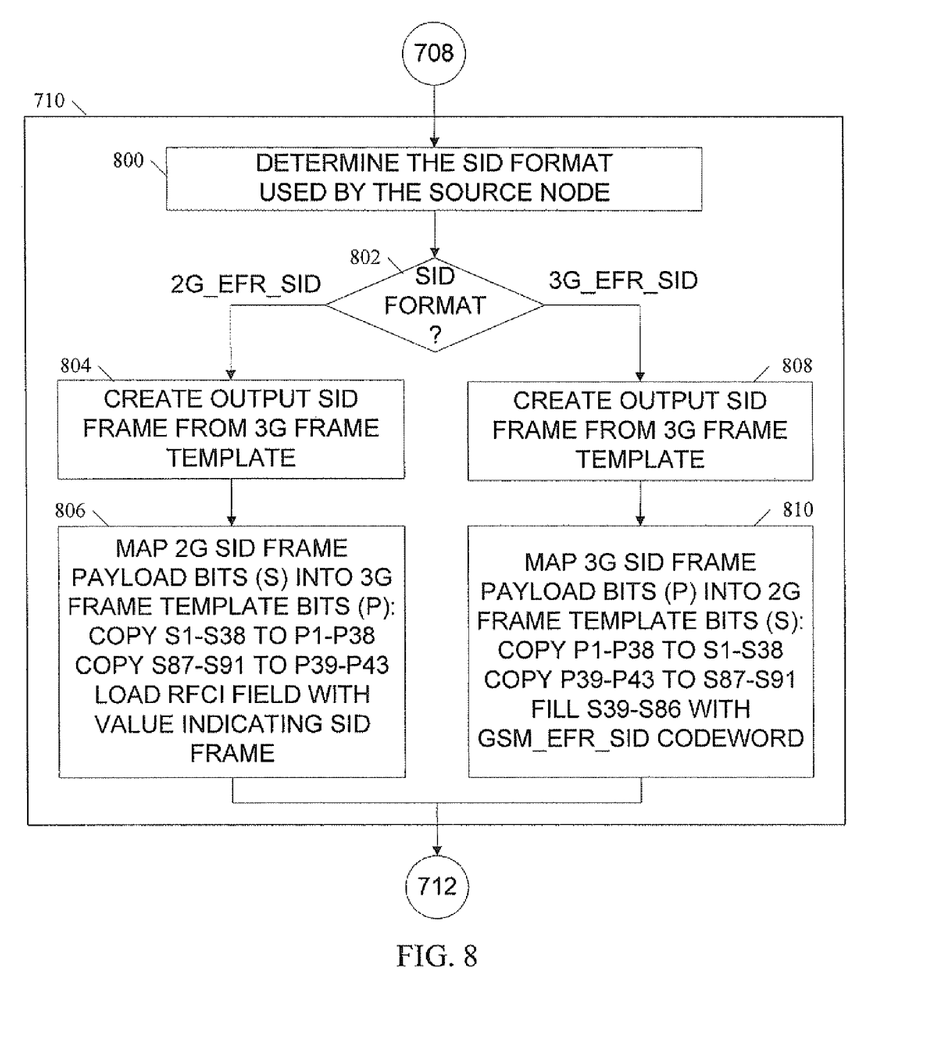
FIG. 8 a flow chart illustrating an exemplary process for converting a SID frame according to an embodiment of the subject matter described herein.

FIG. 8 a flow chart illustrating an exemplary process for converting a SID frame according to an embodiment of the subject matter described herein.

At block 800, SID conversion module 604 determines the SID format used by the source node. For example, SID conversion module 604 may be able to determine the SID format simply from the length of the frame: a 3G SID frame is 43 bits long while a 2G SID frame is 244 bits long.

At block 802, SID conversion module 604 chooses a conversion method based on the source format. For example, if SID conversion module 604 determines that the frame is a 2G SID frame, control flow goes to block 804, and if the frame is a 3G SID frame, control flow goes to block 808.

At block 804, SID conversion module 604 generates an output SID frame from a 3G SID template as illustrated in FIG. 4.

At block 806, SID conversion module 604 populates the output SID frame in the following way, using field names described in FIGS. 4 and 5 for reference: bits S1-S8 of the 2G SID frame are copied into bits P1-P38 of the 3G SID template, and bits S87-S91 are copied into bits P39-P43. The RFCI field is then set with the value for indicating that the frame is a 3G SID frame. Control flow then goes continues to block 712 in FIG. 7, in which the generated output SID frame is sent to the destination node.

At block 808, SID conversion module 604 generates an output SID frame from a 2G SID template as illustrated in FIG. 5.

At block 810, SID conversion module 604 populates the output SID frame in the following way, again using field names described in FIGS. 4 and 5 for reference: bits P1-P8 of the 3G SID frame are copied into bits S1-S38 of the 2G SID template, bits P39-P43 are copied into bits S87-S91, and bits S39-S86 of the 2G SID template are filled with the GSM_E-FR_SID codeword. Control flow then goes continues to block 712 in FIG. 7, in which the generated output SID frame is sent to the destination node.

Figure 9:
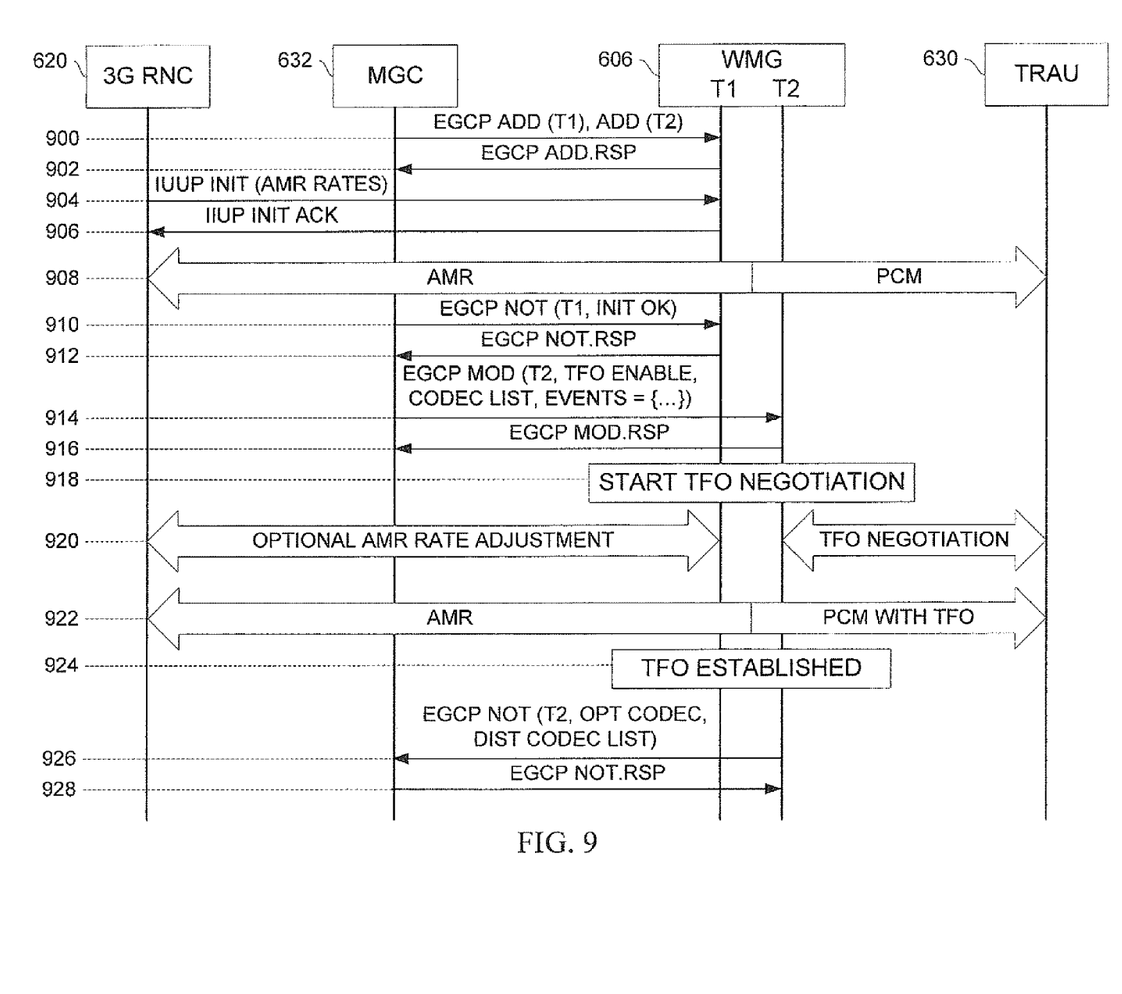
FIG. 9 is a message flow diagram illustrating the steps of an exemplary process for determining whether TFO is applicable according to an embodiment of the subject matter described herein.

FIG. 9 is a message flow diagram illustrating the steps of an exemplary process for determining whether TFO is applicable according to an embodiment of the subject matter described herein. FIG. 9 illustrates the process for negotiating TFO between a 2G network (GSM) and a 3G network (UMTS). TFO is negotiated between two end devices during call setup: a TFO peer on the 2G side, TRAU 630 and RNC 620 on the 3G side. In one embodiment, wireless media gateway WMG 606 is controlled by its mobile switching center MSC 632 via a proprietary protocol EGCP (Extended Gateway Control Protocol). Alternatively, other media gateway control protocols, such as MEGACO/H.248 and MGCP, may be used.

The first pair of messages (messages 900 and 902) are exchanged by MSC 632 and WMG 606 to establish a wireless call at WMG 606. Once the media gateway connection is established, the 3G end device communicates its AMR rate information to the media gateway (messages 904 and 906). A similar process (not shown) establishes a connection between the 2G end device and the closest BTS 622. A media path is established between RNC 620 and TRAU 630. At this point, on the 3G side, the media stream in AMR format is transcoded into PCM at the media gateway and vice versa, without TFO (data stream 908). The two end devices may then start the TFO negotiation.

As the first step of TFO negotiation, WMG 606 sends a notification event (messages 910 and 912) to let that TFO negotiation may commence. RNC 620 sends rate and rate adjustment information to WMG 606 (messages 914 and 916), which passes on the information to the 2G side and starts TFO negotiation (918). During the negotiation process, RNC 620 may negotiate a new AMR rate with the 2G side (920). If the rates of 3G side can be supported by the 2G side and SID frames also match (922), then TFO negotiation concludes successfully (924), and WMG 606 notifies MSC 632 of this fact (messages 926 and 928). As stated above, WMG 606 may store an indication that TFO is in use for the particular call. This indication may be read by control module 602, or in alternative embodiments, by SID conversion module 604, to determine whether TFO is applicable to incoming wireless frame, as illustrated in step 702 of FIG. 7.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for silence insertion descriptor (SID) conversion, the method comprising:
   receiving a wireless frame, the frame identifying a first node as a frame source and a second node as a frame destination;
   determining whether tandem-free operation (TFO) is applicable;
   responsive to a determination that TFO is applicable, determining whether the frame is a SID frame;
   responsive to a determination that the frame is a SID frame, determining whether the SID format used by the first node is incompatible with the SID format used by the second node; and
   responsive to a determination that the SID format used by the first node is incompatible with the SID format used by the second node, converting the frame from the SID format used by the first node to the SID format used by the second node and sending the converted SID frame to the second node.

2. The method of claim 1 wherein determining whether TFO is applicable includes determining whether a speech compression algorithm and data rate used by the first node is the same as a speech compression algorithm and data rate used by the second node.

3. The method of claim 1 wherein determining whether the input frame is a SID frame includes determining, based on the contents of a frame index field indicator, whether the input frame is a SID frame for a third generation (3G) network.

4. The method of claim 1 wherein determining whether the input frame is a SID frame includes determining, based on a designated bit pattern, whether the input frame is a SID frame for a second generation (2G) network.

5. The method of claim 1 wherein converting the SID frame includes:
   locating line spectral frequency information and energy gain information within the frame;
   extracting the line spectral frequency and energy gain information from the frame; and
   generating, as the converted SID frame, a wireless frame of the SID format used by the second node and containing the extracted line spectral frequency and energy gain information.

6. A method for silence insertion descriptor (SID) conversion, the method comprising:
   receiving a wireless frame, the frame identifying a first node as a frame source and a second node as a frame destination;
   identifying a first codec used by the first node and a second codec used by the second node, and determining whether one of the first and second codecs comprises a second generation global system for mobile enhanced full rate (2G_GSM_EFR) codec and the other of the first and second codecs comprises a third generation global system for mobile enhanced full rate (3G_GSM_EFR) codec;

responsive to a determination that the codecs comprise a 2G_GSM_EFR codec and a 3G_GSM_EFR codec, determining whether the frame is a SID frame;

responsive to a determination that the frame is a SID frame, determining whether the SID format used by the first node is incompatible with the SID format used by the second node; and responsive to a determination that the SID format used by the first node is incompatible with the SID format used by the second node, converting the frame from the SID format used by the first node to the SID format used by the second node and sending the converted SID frame to the second node.

7. The method of claim 6 wherein determining whether the input frame is a SID frame includes determining, based on the contents of a frame index field indicator, whether the input frame is a SID frame for a third generation (3G) network.

8. The method of claim 6 wherein determining whether the input frame is a SID frame includes determining, based on a designated bit pattern, whether the input frame is a SID frame for a second generation (2G) network.

9. The method of claim 6 wherein converting the SID frame includes:
   locating line spectral frequency information and energy gain information within the frame;
   extracting the line spectral frequency and energy gain information from the frame; and
   generating, as the converted SID frame, a wireless frame of the SID format used by the second node and containing the extracted line spectral frequency and energy gain information.

10. A system for silence insertion descriptor (SID) conversion, the system comprising:
    a control module for receiving a wireless frame, the frame identifying a first node as a frame source and a second node as a frame destination, and for determining whether tandem-free operation (TFO) is applicable; and
    a SID conversion module, operatively associated with the control module, for determining whether the frame is a SID frame, and, responsive to a determination that the frame is a SID frame, determining whether a SID format used by the first node is incompatible with a SID format used by the second node, and, responsive to a determination that the SID format used by the first node is incompatible with the SID format used by the second node, converting the frame from the SID format used by the first node to the SID format used by the second node and sending the converted frame to the second node.

11. The system of claim 10 wherein the SID conversion module is adapted to determine whether a speech compression algorithm and data rate used by the first node is the same as a speech compression algorithm and data rate used by the second node.

12. The system of claim 10 wherein the SID conversion module is adapted to determine, based on the contents of a frame index field indicator, whether the frame is a SID frame for a third generation (3G) network.

13. The system of claim 10 wherein the SID conversion module is adapted to determine, based on a designated bit pattern, whether the frame is a SID frame for a second generation (2G) network.

14. The system of claim 10 wherein the SID conversion module is adapted to convert the SID frame by:
    locating line spectral frequency information and energy gain information within the frame;
    extracting the line spectral frequency and energy gain information from the frame;
    generating, as the converted SID frame, a wireless frame of the SID format used by the second node and containing the extracted line spectral frequency and energy gain information.

15. A computer program product comprising computer executable instructions embodied in a non-transitory computer readable medium for performing steps comprising:
    receiving a wireless frame, the frame identifying a first node as a frame source and a second node as a frame destination;
    determining whether tandem-free operation (TFO) is applicable;
    responsive to a determination that TFO is applicable, determining whether the frame is a SID frame;
    responsive to a determination that the frame is a SID frame, determining whether the SID format used by the first node is incompatible with the SID format used by the second node;
    responsive to a determination that the SID format used by the first node is incompatible with the SID format used by the second node, converting the frame from the SID format used by the first node to the SID format used by the second node and sending the converted SID frame to the second node.

* * * * *